US011297291B1

(12) United States Patent
Wang

(10) Patent No.: US 11,297,291 B1
(45) Date of Patent: Apr. 5, 2022

(54) CINEMA PROJECTION METHOD AND SYSTEM

(71) Applicant: CFGDC (BeiJing) Technology Co., Ltd., Beijing (CN)

(72) Inventor: Jie Wang, Beijing (CN)

(73) Assignee: CFGDC (BeiJing) Technology Co., Ltd., Beijing (CN)

(*) Notice: Subject to any disclaimer, the term of this patent is extended or adjusted under 35 U.S.C. 154(b) by 0 days.

(21) Appl. No.: 17/152,912

(22) Filed: Jan. 20, 2021

(30) Foreign Application Priority Data

Sep. 27, 2020 (CN) .......................... 202011029263.7

(51) Int. Cl.
| | | |
|---|---|---|
| *H04N 9/31* | (2006.01) | |
| *G03B 21/00* | (2006.01) | |
| *G03B 21/14* | (2006.01) | |
| *G03B 21/32* | (2006.01) | |

(52) U.S. Cl.
CPC ......... *H04N 9/3182* (2013.01); *G03B 21/005* (2013.01); *G03B 21/14* (2013.01); *G03B 21/32* (2013.01); *H04N 9/3123* (2013.01)

(58) Field of Classification Search
CPC .. G03B 21/003; G03B 21/005; G03B 21/006; G03B 21/14; G03B 21/28; G03B 21/32; G03B 21/145; G03B 21/147; G03B 21/208; G03B 21/2053; H04N 9/3102; H04N 9/3105; H04N 9/3111; H04N 9/3123; H04N 9/3126; H04N 9/3141; H04N 9/3158; H04N 9/3179; H04N 9/3182; G09G 2320/023; G09G 2320/0285; G09G 2320/0633; G09G 2320/0646; G09G 3/2003; G09G 3/2018; G09G 3/2051; G09G 3/2077; G09G 3/3426

See application file for complete search history.

(56) References Cited

U.S. PATENT DOCUMENTS

| | | | | |
|---|---|---|---|---|
| 7,551,341 | B1 * | 6/2009 | Ward | G03B 21/005 359/259 |
| 8,842,222 | B2 * | 9/2014 | Iversen | H04N 13/327 348/659 |
| 2013/0169659 | A1 * | 7/2013 | Guthrie | H04N 9/3182 345/589 |
| 2015/0138508 | A1 * | 5/2015 | Sharp | G03B 21/14 353/20 |
| 2016/0088271 | A1 * | 3/2016 | Candry | G09G 3/003 353/31 |

* cited by examiner

*Primary Examiner* — Sultan Chowdhury
(74) *Attorney, Agent, or Firm* — Neugeboren O'Dowd PC

(57) ABSTRACT

A cinema projection method and system are provided, to perform GDR transformation on an original DCP while keeping a luminance component value of pure black unchanged. A transformed DCP has a brighter display luminance than the original DCP, and a display luminance of pure black remains unchanged. By adjusting the PWM, the brightness of a screen display is reduced. To ensure that the transformed DCP has a consistent display luminance with the original DCP, a luminance adjustment consistency mapping model of a local cinema is used to transform a standard PWM level of each frame of the original DCP, to obtain a local PWM level of each frame of the local cinema.

8 Claims, 4 Drawing Sheets

CINEMA PROJECTION METHOD AND SYSTEM

CLAIM OF PRIORITY UNDER 35 U.S.C. § 119

This application claims the priority of Chinese Patent Application No. 202010236443.6, entitled "Cinema Projection Method and System" filed with the China National Intellectual Property Administration on Sep. 27, 2020, which is incorporated herein by reference in its entirety.

TECHNICAL FIELD

The present disclosure relates to the technical field of cinema projection, and in particular, to a cinema projection method and system.

BACKGROUND

When a movie is shown in the theater, if the image luminance of the movie is low while the traditional light source luminance is constant, the electrical information of image pixels (that is, the luminance component Y of the image YVU color space) is more densely concentrated in the low value area. In this case, it is difficult to achieve the theoretical effect (Gamma 2.6 for cinemas) through precise control because the projector cannot darken the dark part of the image enough, and therefore the ANSI contrast of a single-frame image is low.

SUMMARY

The present disclosure aims to provide a cinema projection method and system to improve the ANSI contrast of a digital projector.

To achieve the above objective, the present disclosure provides the following solutions:

A cinema projection method includes: performing global dynamic range (GDR) transformation on an original digital cinema package (DCP) based on a standard luminance component interval of a luminance component of each pixel of each frame of the original DCP, to obtain a transformed luminance component of each pixel of each transformed frame, where all transformed frames form a transformed DCP; determining a standard pulse width modulation (PWM) level of each frame of the original DCP based on a standard luminance component interval of a maximum luminance value of all pixels in each frame of the original DCP; transforming the standard PWM level by using a luminance adjustment consistency mapping model of a local cinema, to obtain a local PWM level of each frame of the local cinema; and based on the transformed luminance component of each pixel of each frame of the transformed DCP, determining a display luminance of each pixel of each frame of the transformed DCP on a local cinema screen by using an electro-optical transfer function (EOTF) corresponding to the local PWM level, to show the transformed DCP in the local cinema.

Optionally, the performing GDR transformation on an original DCP based on a standard luminance component interval of a luminance component of each pixel of each frame of the original DCP, to obtain a transformed luminance component of each pixel of each transformed frame specifically includes: based on the standard luminance component interval of the luminance component of each pixel of each frame of the original DCP, performing GDR transformation on the luminance component $Y_{SDR}$ of each pixel of each frame of the original DCP by using a formula $$Y_{GDR} = INT\left(\frac{Y_{SDR} \times 4095}{\text{percent\_pixel}}\right)$$

to obtain the transformed luminance component $Y_{GDR}$ of each pixel of each frame of the transformed DCP, where percent_pixel is a right boundary value of the standard luminance component interval, all values of percent_pixel are standard luminance components corresponding to 10%, 20%, 30%, 40%, 50%, 60%, 70%, 80%, 90%, and 100% of a maximum display luminance of the screen, percent_pixel=1689, 2205, 2577, 2879, 3137, 3365, 3570, 3758, 3932, 4095, and INT ( ), is a rounding function.

Optionally, an EOTF corresponding to the standard PWM level is $$L = \left(\frac{Y_{GDR} \times \text{percent\_pixel}}{4095^2}\right)^{2.6} \times 48$$

where L is a display luminance of each pixel of each frame of the transformed DCP of a standard cinema on the screen, $Y_{GDR}$ is the transformed luminance component, and percent_pixel a right boundary value of the standard luminance component interval.

Optionally, before the transforming the standard PWM level by using a luminance adjustment consistency mapping model of a local cinema, to obtain a local PWM level of each frame of the local cinema, the method further includes: obtaining a first display luminance on a local cinema screen corresponding to a maximum luminance value of all pixels in each frame of an original DCP sample; based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample; determining a display luminance difference between the first display luminance and the second display luminance; when the display luminance difference is not within a digital cinema initiatives (DCI) luminance tolerance range, adjusting the standard PWM level of the original DCP sample to obtain an updated standard PWM level of the original DCP sample, and returning to the step of "based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample"; when the display luminance difference is within the DCI luminance tolerance range, using the updated standard PWM level of the original DCP sample as a local PWM level of the original DCP sample of the local cinema; and determining a mapping relationship between the standard PWM level of the original DCP sample and the local PWM level of the original DCP sample, and using the mapping relationship as the luminance adjustment consistency mapping model of the local cinema.

A cinema projection system includes: a transformed luminance component obtaining module, configured to transform an original DCP based on a standard luminance component interval of a luminance component of each pixel of each frame of the original DCP by using GDR transformation, to obtain a transformed luminance component of each pixel of each transformed frame, where all transformed frames form a transformed DCP; a standard PWM level determining module, configured to determine a standard PWM level of each frame of the original DCP based on a standard luminance component interval of a maximum luminance value of all pixels in each frame of the original DCP; a local PWM level determining module, configured to transform the standard PWM level by using a luminance adjustment consistency mapping model of a local cinema, to obtain a local PWM level of each frame of the local cinema; a local cinema projection module, configured to, based on the transformed luminance component of each pixel of each frame of the transformed DCP, determine a display luminance of each pixel of each frame of the transformed DCP on a local cinema screen by using an EOTF corresponding to the local PWM level, to show the transformed DCP in the local cinema.

Optionally, the transformed luminance component obtaining module specifically includes: a transformed luminance component obtaining submodule, configured to, based on the standard luminance component interval of the luminance component of each pixel of each frame of the original DCP, perform GDR transformation on the luminance component $Y_{SDR}$ of each pixel of each frame of the original DCP by using a formula $$Y_{GDR} = INT\left(\frac{Y_{SDR} \times 4095}{\text{percent\_pixel}}\right)$$

to obtain the transformed luminance component $Y_{GDR}$ of each pixel of each frame, where percent_pixel is a right boundary value of the standard luminance component interval, all values of percent_pixel are standard luminance components corresponding to 10%, 20%, 30%, 40%, 50%, 60%, 70%, 80%, 90%, and 100% of a maximum display luminance of the screen, percent_pixel=1689, 2205, 2577, 2879, 3137, 3365, 3570, 3758, 3932, 4095, and INT ( ) is a rounding function.

Optionally, an EOTF corresponding to the standard PWM level is $$L = \left(\frac{Y_{GDR} \times \text{percent\_pixel}}{4095^2}\right)^{2.6} \times 48$$

where L is a display luminance of each pixel of each frame of the transformed DCP of a standard cinema on the screen, $Y_{GDR}$ is the transformed luminance component, and percent_pixel is a right boundary value of the standard luminance component interval.

Optionally, the system further includes: a first display luminance obtaining submodule, configured to obtain a first display luminance on the local cinema screen corresponding to a maximum luminance value of all pixels in each frame of an original DCP sample; a second display luminance determining submodule, configured to, based on a transformed luminance component of each pixel of each frame of a transformed DCP sample, determine a second display luminance of each pixel of each frame of the transformed DCP sample on the local cinema screen by using an EOTF corresponding to a standard PWM level of the original DCP sample; a display luminance difference determining submodule, configured to determine a display luminance difference between the first display luminance and the second display luminance; a standard PWM level update submodule, configured to, when the display luminance difference is not within a DCI luminance tolerance range, adjust the standard PWM level of the original DCP sample to obtain an updated standard PWM level of the original DCP sample, and return to the step of "based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample"; a local PWM level determining submodule, configured to, when the display luminance difference is within the DCI luminance tolerance range, use the updated standard PWM level of the original DCP sample as a local PWM level of the original DCP sample of the local cinema; and a luminance adjustment consistency mapping model determining submodule, configured to determine a mapping relationship between the standard PWM level of the original DCP sample and the local PWM level of the original DCP sample, and use the mapping relationship as the luminance adjustment consistency mapping model of the local cinema.

According to specific embodiments of the present disclosure, the present disclosure has the following technical effects. The present disclosure provides a cinema projection method and system, to perform GDR transformation on an original DCP while keeping a luminance component value of pure black unchanged. A transformed DCP has a brighter display luminance than the original DCP, and a display luminance of pure black remains unchanged. To ensure that the transformed DCP has a consistent display luminance with the original DCP, a luminance adjustment consistency mapping model of a local cinema is used to transform a standard PWM level of each frame of the original DCP, to obtain a local PWM level of each frame of the local cinema, and an electro-optical transformation function corresponding to the local PWM level is used to adjust the display luminance, so that a display luminance of pure white of each frame of the transformed DCP is unchanged while the display luminance of pure black is reduced. This improves the ANSI contrast of different cinemas, thereby enhancing the cinema projection effect.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Notably, the accompanying drawings in the following description show some embodiments of the present disclosure, and those of ordinary skill in the art may still derive other drawings from these accompanying drawing without any creative efforts.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a cinema projection method and system to improve the ANSI contrast of a digital projector.

To make the foregoing objective, features, and advantages of the present disclosure clearer and more comprehensible, the present disclosure is further described in detail below with reference to the accompanying drawings and specific embodiments.

Figure 1:
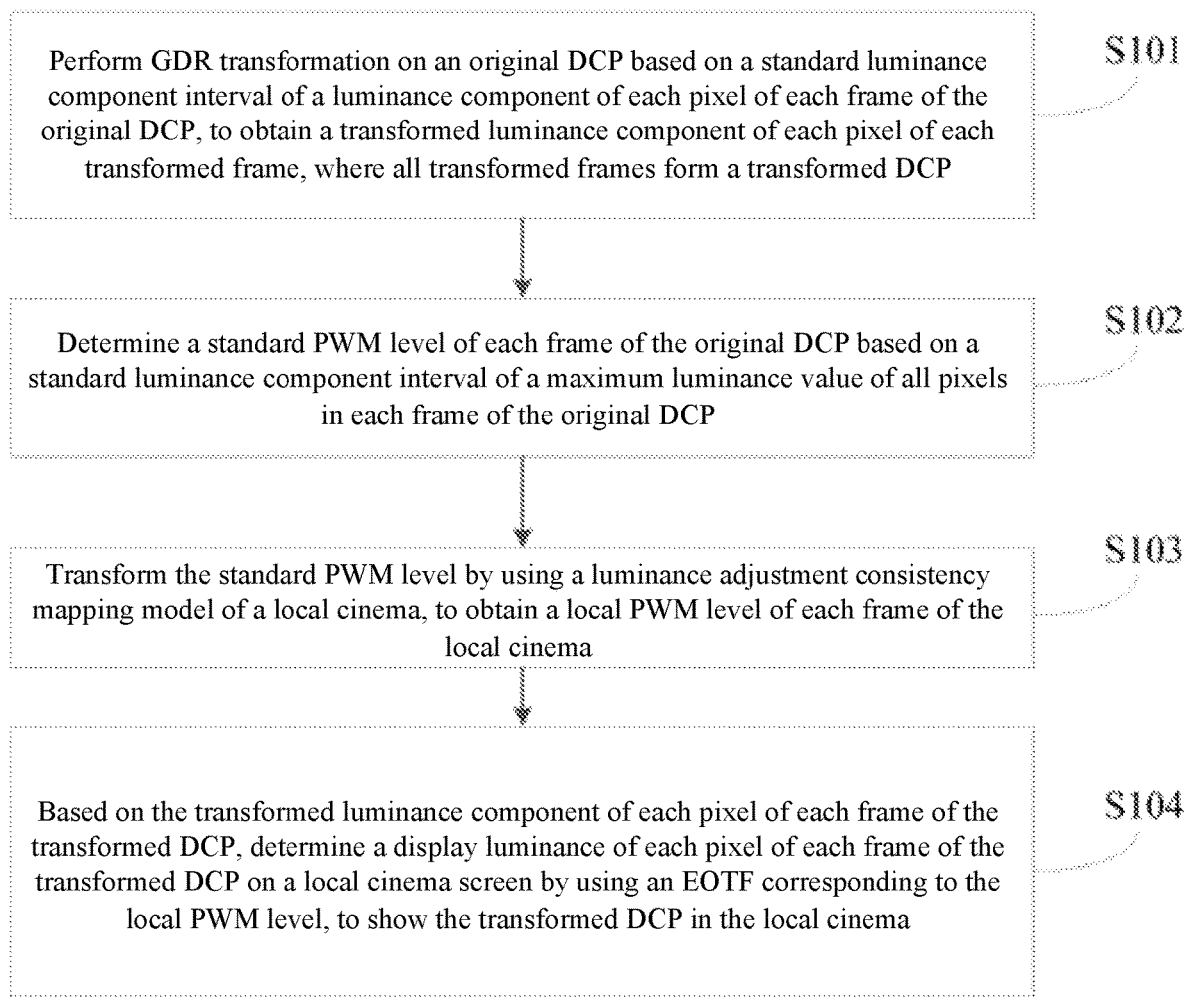
FIG. 1 is a flowchart of a cinema projection method according to the present disclosure.

FIG. 1 is a flowchart of a cinema projection method according to the present disclosure. The cinema projection method includes the following steps. S101: Perform GDR transformation on an original DCP based on a standard luminance component interval of a luminance component of each pixel of each frame of the original DCP, to obtain a transformed luminance component of each pixel of each transformed frame, where all transformed frames form a transformed DCP. S102: Determine a standard PWM level of each frame of the original DCP based on a standard luminance component interval of a maximum luminance value of all pixels in each frame of the original DCP. S103: Transform the standard PWM level by using a luminance adjustment consistency mapping model of a local cinema, to obtain a local PWM level of each frame of the local cinema. S104: Based on the transformed luminance component of each pixel of each frame of the transformed DCP, determine a display luminance of each pixel of each frame of the transformed DCP on a local cinema screen by using an EOTF corresponding to the local PWM level, to show the transformed DCP in the local cinema.

Figure 4:
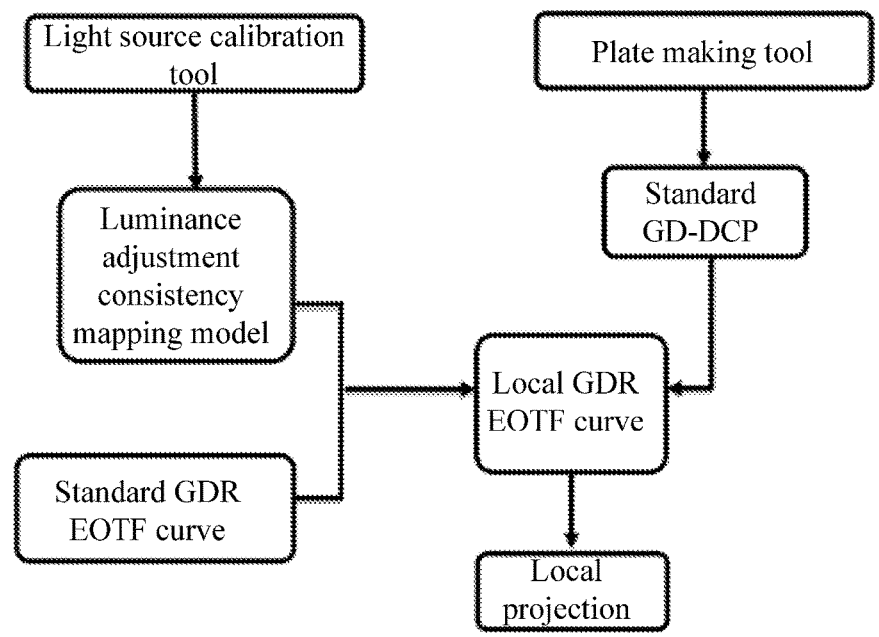
FIG. 4 is a principle diagram of local cinema projection according to the present disclosure.

FIG. 4 is a principle diagram of local cinema projection according to the present disclosure.

A production process of GDR transformation of original images based on different PWM levels includes steps S101 and S102. Step S101 specifically includes: based on the standard luminance component interval of the luminance component of each pixel of each frame of the original DCP, performing GDR transformation on the luminance component $Y_{SDR}$ of each pixel of each frame of the original DCP by using a formula $$Y_{GDR} = INT\left(\frac{Y_{SDR} \times 4095}{percent\_pixel}\right)$$

to obtain the transformed luminance component $Y_{GDR}$ of each pixel of each transformed frame, where percent_pixel is a right boundary value of the standard luminance component interval, all values of percent_pixel are standard luminance components corresponding to 10%, 20%, 30%, 40%, 50%, 60%, 70%, 80%, 90%, and 100% of a maximum display luminance of the screen, percent_pixel=1689, 2205, 2577, 2879, 3137, 3365, 3570, 3758, 3932, 4095, and INT ( ) is a rounding function.

Figure 2:
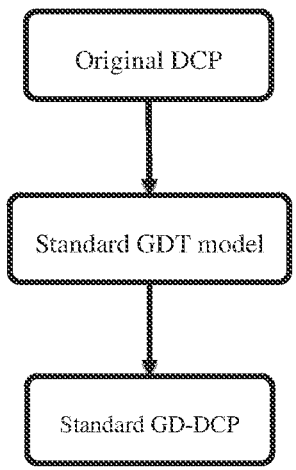
FIG. 2 is a principle diagram of a GDT standard model transformation process according to the present disclosure.

A process of transforming the original DCP into a GD-DCP (transformed DCP) is a standard GDT model transformation process. The entire transformation process is completed by a plate making tool, which contains a standard GDT model, as shown in the FIG. 2.

The formula of the standard GDT model is:

$$Y_{GDR} = INT\left(\frac{Y_{SDR} \times 4095}{percent\_pixel}\right), Y_{SDR} \in [0, percent\_pixel]$$

where percent_pixel=1689, 2205, 2577, 2879, 3137, 3365, 3570, 3758, 3932, 4095.

After the original DCP is processed by the standard GDT model. Therefore, except for frames in the original DCP with the maximum luminance within the interval [3932, 4095], luminance components Y of all other frames increase. After the processing by the standard GDT model, a brightened DCP is obtained. A corresponding PWM level is determined based on the maximum luminance of the luminance component Y of each frame of the original DCP. The brightened DCP and the corresponding standard PWM levels form a standard GD-DCP.

An EOTF corresponding to the standard PWM level is $$L = \left(\frac{Y_{GDR} \times percent\_pixel}{4095^2}\right)^{2.6} \times 48$$

where L is a display luminance of each pixel of each frame of the transformed DCP screen in an ideal condition, $Y_{GDR}$ is the transformed luminance component, and percent_pixel is the right boundary value of the standard luminance component interval.

Step S103 is a cinema calibration process. Because different cinemas have different projection devices and projection environments, the standard GD-DCP obtained by the foregoing standard transformation method may be inapplicable to other cinemas. To be specific, the screen display luminance before and after the transformation is beyond a digital cinema initiatives (DCI) luminance tolerance range. The solution is to adjust the PWM level. The PWM adjustment accuracy is 1%. Therefore, a PWM value within the DCI luminance tolerance range can definitely be found for a cinema.

Figure 3:
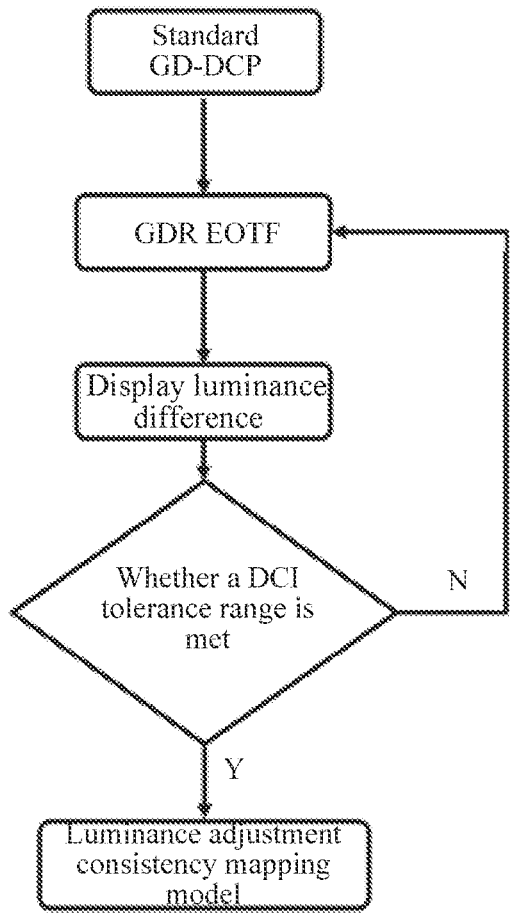
FIG. 3 is a principle diagram of obtaining a luminance adjustment consistency mapping model according to the present disclosure.

The cinema calibration process is to find a mapping relationship $PWM_{std} \leftrightarrow PWM_{local}$ between an appropriate PWM level for the local cinema and the standard PWM level. This mapping relationship is called the luminance adjustment consistency mapping model. The entire calibration process is completed using a light source calibration tool. The calibration flowchart is shown in FIG. 3. The specific process is as follows: obtaining a first display luminance on a local cinema screen corresponding to a maximum luminance value of all pixels in each frame of an original DCP sample; based on a transformed luminance component of each pixel of each frame of a transformed DCP sample, determining a second display luminance of each pixel of each frame of the transformed DCP sample on the local cinema screen by using an EOTF (GDR EOTF in FIG. 4) corresponding to a standard PWM level of the original DCP sample; determining a display luminance difference between the first display luminance and the second display luminance; when the display luminance difference is not within a DCI luminance tolerance range, adjusting the standard PWM level of the original DCP sample to obtain an updated standard PWM level of the original DCP sample, and returning to the step of "based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample"; when the display luminance difference is within the DCI luminance tolerance range, using the updated standard PWM level of the original DCP sample as a local PWM level of the original DCP sample of the local cinema; and determining a mapping relationship between the standard PWM level of the original DCP sample and the local PWM level of the original DCP sample, and using the mapping relationship as the luminance adjustment consistency mapping model of the local cinema. The luminance adjustment consistency mapping model of the local cinema needs to be calibrated periodically.

The DCI luminance tolerance range is ±10.2 cd/m² (±3.00 fL).

Figure 5:
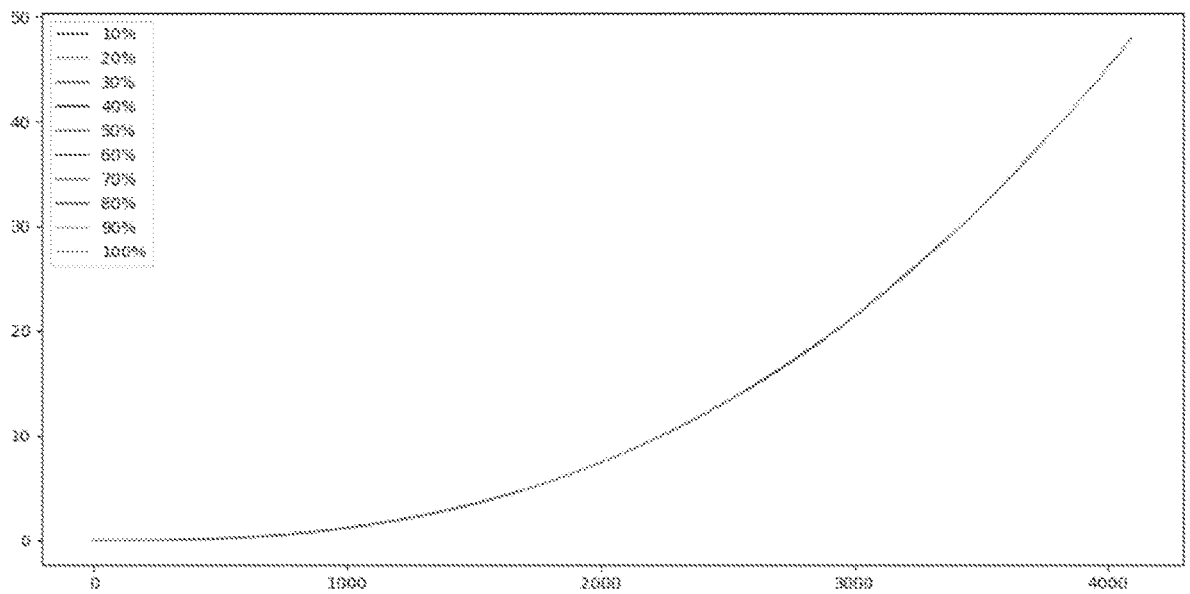
FIG. 5 is a schematic diagram of a standard SDR electro-optical transfer function (EOTF) curve.
Figure 6:
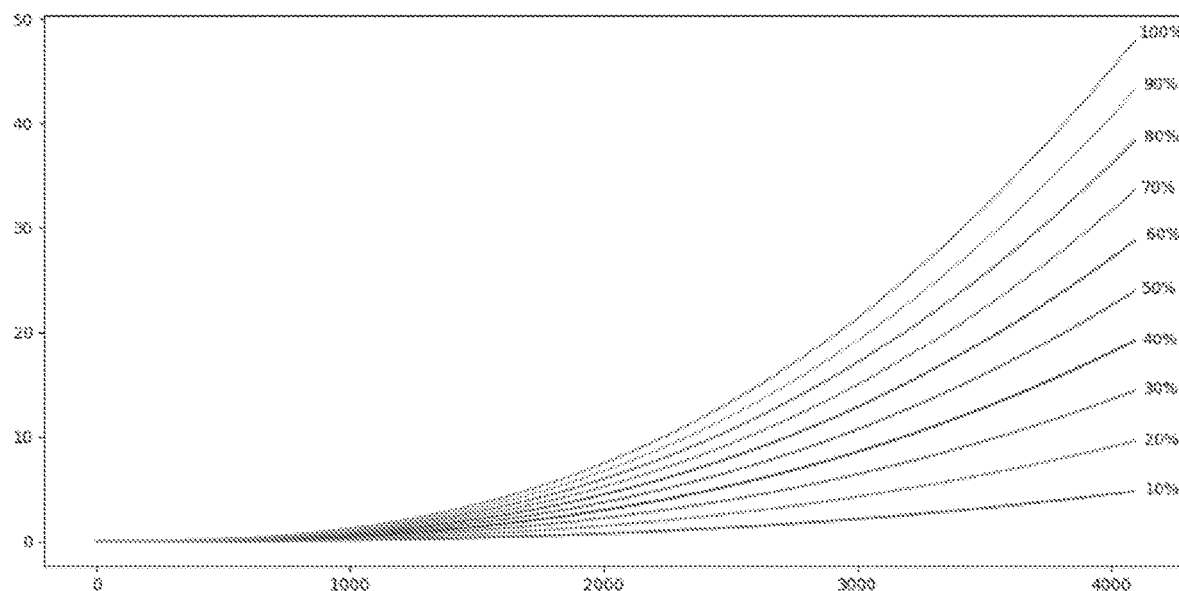
FIG. 6 is a schematic diagram of standard GDR EOTF curves under different PWM levels.

FIG. 5 shows a standard SDR EOTF curve. FIG. 6 shows standard GDR EOTF curves under different PWM levels. As seen from FIG. 6, the local GDR EOTF curve is theoretically consistent with the standard GDR EOTF curve, except that the PWM levels are different. In both FIG. 5 and FIG. 6, horizontal coordinates represent the luminance component Y, and vertical coordinates represent the screen display luminance in cd/m².

The cinema projection method according to the present disclosure has the following technical effects.

During the GD-DCP creation process, the Y values of the luminance component of each frame is also adjusted according to the formula, but the Y value of pure black (Y=0) remains unchanged. Without PWM adjustment, the GD-DCP obtained by transformation has a brighter display luminance than the original DCP, while the display luminance of the dark field (pure black) is unchanged. To ensure the consistent screen display luminance of each frame before and after transformation, PWM adjustment is required, so that the display luminance of the GD-DCP is consistent with that of the original DCP in each frame, or is within the DCI luminance tolerance range.

1. The ANSI contrast is improved, which improves the cinema projection effect. Adjusting the PWM level is actually adjusting the output power of the projector. When the PWM level is not adjusted, the output power of the projector always remains unchanged. In this case, for frames with a small luminance component Y, there will be excess power, and because the output power cannot be adjusted, the display luminance of the dark field cannot be reduced to a very low level. According to the transformation formula, for any frame, when the maximum value of the luminance component Y of the frame is in the interval [3933, 4095], all Y values of the frame before and after the transformation remain unchanged, and the projector output power should remain unchanged; for frames with the maximum value of the luminance component Yin [0, 3932], after transformation, the value of the luminance component Y increases. Therefore, for these frames, the PWM level needs to be adjusted to keep the display luminance consistent before and after transformation of the DCP. The output power of the projector should be reduced, and a display luminance darker than that before the adjustment is achieved for the pure black part based on the PWM adjustment. For a frame in the GD-DCP, the display luminance of pure white remains unchanged, while the display luminance of pure black is reduced and the ANSI contrast is increased. Although the display luminance of pure white needs to be kept unchanged, the output power cannot be adjusted to a very low level, and the dark field cannot be reduced to nearly full darkness, but tests show that the ANSI contrast always remains at 137: 1 to 138:1, which is always far higher than the minimum 100:1 required by cinemas. Table 1 shows the ANSI contrast under different PWM levels.

TABLE 1

ANSI contrast under different PWM levels

| PWM | 10% | 15% | 20% | 25% | 30% | 35% | 40% | 45% | 50% |
|---|---|---|---|---|---|---|---|---|---|
| ANSI contrast | — | 138 | 138 | 137 | 138 | 137 | 138 | 137 | 138 |
| PWM | 55% | 60% | 65% | 70% | 75% | 80% | 85% | 90% | 95% |
| ANSI contrast | 138 | 137 | 138 | 137 | 137 | 138 | 138 | 138 | 137 |

2. The sequential contrast is improved. For the sequential contrast, the luminance of the full-white frame remains unchanged, and the full-black dark field can achieve a nearly full-dark effect by adjusting the PWM level, so the sequential contrast is greatly improved. The sequential contrast of the image can be increased from 1660:1 without dimming to 7000:1 or even higher, especially the luminance of the dark field image can reach 9.03614E-05 nits, which is close to full darkness and darker than a luminance of 0.33 nits without dimming by more than 10,000 times.

3. Saving electricity. Because the GD-DCP transformation process increases the Y values of all frames with the maximum luminance component Y in the interval [0, 3932], adjusting the PWM level accordingly will reduce the output power of the projector. Statistical testing shows that for a cinema, if the average value of the maximum luminance values of all frames is 70% of the maximum luminance value, electricity can be saved by about 30%.

The present disclosure further provides a cinema projection system. The system includes: a transformed luminance component obtaining module, a standard PWM level determining module, a local PWM level determining module, and a local cinema projection module.

The transformed luminance component obtaining module is configured to transform an original DCP based on a standard luminance component interval of a luminance component of each pixel of each frame of the original DCP by using GDR transformation, to obtain a transformed luminance component of each pixel of each transformed frame, where all transformed frames form a transformed DCP.

The standard PWM level determining module is configured to determine a standard PWM level of each frame of the original DCP based on a standard luminance component interval of a maximum luminance value of all pixels in each frame of the original DCP.

The local PWM level determining module is configured to transform the standard PWM level by using a luminance adjustment consistency mapping model of a local cinema, to obtain a local PWM level of each frame of the local cinema.

The local cinema projection module is configured to, based on the transformed luminance component of each pixel of each frame of the transformed DCP, determine a display luminance of each pixel of each frame of the transformed DCP on a local cinema screen by using an EOTF corresponding to the local PWM level, to show the transformed DCP in the local cinema.

The transformed luminance component obtaining module specifically includes a transformed luminance component obtaining submodule.

The transformed luminance component obtaining submodule is configured to, based on the standard luminance component interval of the luminance component of each pixel of each frame of the original DCP, perform GDR transformation on the luminance component $Y_{SDR}$ of each pixel of each frame of the original DCP by using a formula $$Y_{GDR} = INT\left(\frac{Y_{SDR} \times 4095}{percent\_pixel}\right)$$

to obtain the transformed luminance component $Y_{GDR}$ of each pixel of each frame, where percent_pixel is a right boundary value of the standard luminance component interval, all values of percent_pixel are standard luminance components corresponding to 10%, 20%, 30%, 40%, 50%, 60%, 70%, 80%, 90%, and 100% of a maximum display luminance of the screen, percent_pixel=1689, 2205, 2577, 2879, 3137, 3365, 3570, 3758, 3932, 4095, and INT ( ) is a rounding function.

An EOTF corresponding to the standard PWM level is $$L = \left(\frac{Y_{GDR} \times percent\_pixel}{4095^2}\right)^{2.6} \times 48$$

where L is a display luminance of each pixel of each frame of the transformed DCP of a standard cinema on the screen, $Y_{GDR}$ is the transformed luminance component, and percent_pixel is the right boundary value of the standard luminance component interval.

A cinema projection system further includes: a first display luminance obtaining submodule, a second display luminance determining submodule, a display luminance difference determining submodule, a standard PWM level update submodule, a local PWM level determining submodule, and a luminance adjustment consistency mapping model determining submodule.

The first display luminance obtaining submodule is configured to obtain a first display luminance on the local cinema screen corresponding to a maximum luminance value of all pixels in each frame of an original DCP sample.

The second display luminance determining submodule is configured to, based on a transformed luminance component of each pixel of each frame of a transformed DCP sample, determine a second display luminance of each pixel of each frame of the transformed DCP sample on the local cinema screen by using an EOTF corresponding to a standard PWM level of the original DCP sample.

The display luminance difference determining submodule is configured to determine a display luminance difference between the first display luminance and the second display luminance.

The standard PWM level update submodule is configured to, when the display luminance difference is not within a DCI luminance tolerance range, adjust the standard PWM level of the original DCP sample to obtain an updated standard PWM level of the original DCP sample, and return to the step of "based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample".

The local PWM level determining submodule is configured to, when the display luminance difference is within the DCI luminance tolerance range, use the updated standard PWM level of the original DCP sample as a local PWM level of the original DCP sample of the local cinema.

The luminance adjustment consistency mapping model determining submodule is configured to determine a mapping relationship between the standard PWM level of the original DCP sample and the local PWM level of the original DCP sample, and use the mapping relationship as the luminance adjustment consistency mapping model of the local cinema.

The present disclosure expands the high-density pixel information to the theoretical maximum electrical information range through remapping of the original image, and adjusts the luminance of the light source, thereby ensuring that the actual presentation effect reaches the theoretical projection effect, that is, increasing the ANSI contrast and providing better cinema projection effect Terms GD: Global Dimming, which means adjusting the overall presentation effect by adjusting the luminance of the light source, which is different from local dimming.

DCI: Digital Cinema Initiatives, which defines the screening standards of digital movies.

EOTF: Electro-optical Transfer Function, a function used to transform digital images to the luminance of light, which is the commonly used Gamma transformation.

PWM: Pulse Width Modulation, which is used in this patent to change the duty cycle of the pulse to notify the light source to adjust the luminance.

SDR: Standard Dynamic Range, using the EOTF specified by DCI (Gamma=2.6).

GDR: Global Dynamic Range, used to distinguish SDR and HDR.

GD-DCP: GDR transformed cinema.

DCP: Digital Cinema Package, which is used to store and transform the audio, image and data streams of digital images, and is a media file package used by cinema projectors.

Each embodiment of the present specification is described in a progressive manner, each embodiment focuses on the difference from other embodiments, and the same and similar parts between the embodiments may refer to each other. For a system disclosed in the embodiments, since the system corresponds to the method disclosed in the embodiments, the description is relatively simple, and reference can be made to the method description.

In this specification, several specific examples are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation to the present disclosure.

What is claimed is:

1. A cinema projection method, wherein the cinema projection method comprises:

performing global dynamic range (GDR) transformation on an original digital cinema package (DCP) based on a standard luminance component interval of a luminance component of each pixel of each frame of the original DCP, to obtain a transformed luminance component of each pixel of each transformed frame, wherein all transformed frames form a transformed DCP;

determining a standard pulse width modulation (PWM) level of each frame of the original DCP based on a standard luminance component interval of a maximum luminance value of all pixels in each frame of the original DCP;

transforming the standard PWM level by using a luminance adjustment consistency mapping model of a local cinema, to obtain a local PWM level of each frame of the local cinema; and based on the transformed luminance component of each pixel of each frame of the transformed DCP, determining a display luminance of each pixel of each frame of the transformed DCP on a local cinema screen by using an electro-optical transfer function (EOTF) corresponding to the local PWM level, to show the transformed DCP in the local cinema.

2. The cinema projection method according to claim 1, wherein the performing GDR transformation on an original DCP based on a standard luminance component interval of a luminance component of each pixel of each frame of the original DCP, to obtain a transformed luminance component of each pixel of each transformed frame specifically comprises:

based on the standard luminance component interval of the luminance component of each pixel of each frame of the original DCP, performing GDR transformation on the luminance component $Y_{SDR}$ of each pixel of each frame of the original DCP by using a formula $$Y_{GDR} = INT\left(\frac{Y_{SDR} \times 4095}{percent\_pixel}\right)$$

to obtain the transformed luminance component $Y_{GDR}$ of each pixel of each frame of the transformed DCP, wherein percent_pixel is a right boundary value of the standard luminance component interval, all values of percent_pixel are standard luminance components corresponding to 10%, 20%, 30%, 40%, 50%, 60%, 70%, 80%, 90%, and 100% of a maximum display luminance of the screen, percent_pixel=1689, 2205, 2577, 2879, 3137, 3365, 3570, 3758, 3932, 4095, and INT ( ) is a rounding function.

3. The cinema projection method according to claim 1, wherein an EOTF corresponding to the standard PWM level is $$L = \left(\frac{Y_{GDR} \times percent\_pixel}{4095^2}\right)^{2.6} \times 48$$

wherein L is a display luminance of each pixel of each frame of the transformed DCP of a standard cinema on the screen, $Y_{GDR}$ is the transformed luminance component, and percent_pixel is a right boundary value of the standard luminance component interval.

4. The cinema projection method according to claim 1, wherein obtaining the luminance adjustment consistency mapping model of the local cinema comprises:

obtaining a first display luminance on a local cinema screen corresponding to a maximum luminance value of all pixels in each frame of an original DCP sample;

based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample;

determining a display luminance difference between the first display luminance and the second display luminance;

when the display luminance difference is not within a digital cinema initiatives (DCI) luminance tolerance range, adjusting the standard PWM level of the original DCP sample to obtain an updated standard PWM level of the original DCP sample, and returning to the step of based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sampler;

when the display luminance difference is within the DCI luminance tolerance range, using the updated standard PWM level of the original DCP sample as a local PWM level of the original DCP sample of the local cinema; and determining a mapping relationship between the standard PWM level of the original DCP sample and the local PWM level of the original DCP sample, and using the mapping relationship as the luminance adjustment consistency mapping model of the local cinema.

5. A cinema projection system, wherein the cinema projection system comprises a processor and a local cinema projector, wherein:

the processor is configured to:

transform an original DCP based on a standard luminance component interval of a luminance component of each pixel of each frame of the original DCP by using GDR transformation, to obtain a transformed luminance component of each pixel of each transformed frame, wherein all transformed frames form a transformed DCP;

determine a standard PWM level of each frame of the original DCP based on a standard luminance component interval of a maximum luminance value of all pixels in each frame of the original DCP; and transform the standard PWM level by using a luminance adjustment consistency mapping model of a local cinema, to obtain a local PWM level of each frame of the local cinema; and the local cinema projector is configured to, based on the transformed luminance component of each pixel of each frame of the transformed DCP, determine a display luminance of each pixel of each frame of the transformed DCP on a local cinema screen by using an EOTF corresponding to the local PWM level, to show the transformed DCP in the local cinema.

6. The cinema projection system according to claim 5, wherein the processor is further configured to, based on the standard luminance component interval of the luminance component of each pixel of each frame of the original DCP, perform GDR transformation on the luminance component $Y_{SDR}$ of each pixel of each frame of the original DCP by using a formula $$Y_{GDR} = INT\left(\frac{Y_{SDR} \times 4095}{\text{percent\_pixel}}\right)$$

to obtain the transformed luminance component $Y_{GDR}$ of each pixel of each frame, wherein
 percent_pixel is a right boundary value of the standard luminance component interval, all values of percent_pixel are standard luminance components corresponding to 10%, 20%, 30%, 40%, 50%, 60%, 70%, 80%, 90%, and 100% of a maximum display luminance of the screen, percent_pixel=1689, 2205, 2577, 2879, 3137, 3365, 3570, 3758, 3932, 4095, and INT ( ) is a rounding function.

7. The cinema projection system according to claim 5, wherein an EOTF corresponding to the standard PWM level is $$L = \left(\frac{Y_{GDR} \times \text{percent\_pixel}}{4095^2}\right)^{2.6} \times 48$$

wherein L is a display luminance of each pixel of each frame of the transformed DCP of a standard cinema on the screen, $Y_{GDR}$ is the transformed luminance component, and percent_pixel is a right boundary value of the standard luminance component interval.

8. The cinema projection system according to claim 5, wherein the processor is further configured to:

obtain a first display luminance on the local cinema screen corresponding to a maximum luminance value of all pixels in each frame of an original DCP sample;
 based on a transformed luminance component of each pixel of each frame of a transformed DCP sample, determine a second display luminance of each pixel of each frame of the transformed DCP sample on the local cinema screen by using an EOTF corresponding to a standard PWM level of the original DCP sample;
 determine a display luminance difference between the first display luminance and the second display luminance;
 when the display luminance difference is not within a DCI luminance tolerance range, adjust the standard PWM level of the original DCP sample to obtain an updated standard PWM level of the original DCP sample, and return to the step of based on a transformed luminance component of each pixel of each frame of a transformed DCP sample, determining a second display luminance of each pixel of each frame of the transformed DCP sample on the local cinema screen by using an EOTF corresponding to a standard PWM level of the original DCP sample;
 when the display luminance difference is within the DCI luminance tolerance range, use the updated standard PWM level of the original DCP sample as a local PWM level of the original DCP sample of the local cinema; and
 determine a mapping relationship between the standard PWM level of the original DCP sample and the local PWM level of the original DCP sample, and use the mapping relationship as the luminance adjustment consistency mapping model of the local cinema.

\* \* \* \* \*